US008325746B2

(12) United States Patent
Somasundaram et al.

(10) Patent No.: US 8,325,746 B2
(45) Date of Patent: Dec. 4, 2012

(54) TOPOLOGY SELECTION AND BROADCAST METHOD FOR RULE-BASED LINK STATE ROUTING

(75) Inventors: Kiran K. Somasundaram, Greenbelt, MD (US); Kaustubh Jain, College Park, MD (US); Vahid Tabatabaee, Gaithersburg, MD (US); John S. Baras, Potomac, MD (US)

(73) Assignee: University of Maryland, College Park, College Park, MD (US)

( * ) Notice: Subject to any disclaimer, the term of this patent is extended or adjusted under 35 U.S.C. 154(b) by 235 days.

(21) Appl. No.: 12/923,812

(22) Filed: Oct. 8, 2010

(65) Prior Publication Data

US 2011/0085472 A1    Apr. 14, 2011

Related U.S. Application Data

(60) Provisional application No. 61/249,724, filed on Oct. 8, 2009.

(51) Int. Cl.
  *H04L 12/28*    (2006.01)
(52) U.S. Cl. ........ 370/401; 370/390; 370/432; 370/338; 370/254
(58) Field of Classification Search .................. None
  See application file for complete search history.

(56) References Cited

U.S. PATENT DOCUMENTS

| 7,782,798 | B2 * | 8/2010 | Xu .............................. 370/255 |
| 2003/0165117 | A1 * | 9/2003 | Garcia-Luna-Aceves et al. ............................ 370/238 |

OTHER PUBLICATIONS

Somasundaram et al, "Novel Topology Selection and Broadcast Mechanism for Link State Stable Path Routing", Institute of Systems Research and Department of Electrical and Computer Engineering, UMD, Oct. 7, 2009, pp. 1-8.
Somasundaram, et al, "Distributed Topology Control for Stable Path Routing in Multi-hop Wireless Networks", Institute of Systems Research and Department of Electrical and Computer Engineering, UMD, date unknown, pp. 1-13.
OSPF Design guide, www.cisco.com/en/US/tech/tk365/technologies_white_paper09186a0080094e9e.shtml, 53 pages, 2005.
Williams et al., "Comparison of Broadcasting Techniques for Mobile Ad-Hoc Networks" Proceedings of the ACM International Symposium on Mobile Ad-Hoc Networking and Computing (MOBIHOC), 16 pages, 2002.

(Continued)

*Primary Examiner* — Duc C Ho
(74) *Attorney, Agent, or Firm* — Nixon & Vanderhye PC

(57) ABSTRACT

An apparatus and method are provided for optimizing the link-state information that is to be broadcast in a routing domain of a communication network for QoS rule-based link-state routing. The routers include any device capable of implementing the routing primitives. The apparatus and method involve pruning the link-state information using local neighborhood information that has been discovered. The local link-state is pruned so that the QoS optimal paths are preserved for link-state routing. Pruning of the potential optimal paths is carried out to minimize the information broadcast to the intra domain routers in an autonomous system/routing domain. The apparatus and method also involve broadcasting the selected link-state information.

14 Claims, 6 Drawing Sheets

OTHER PUBLICATIONS

Fricke, et al., "Routing Metrics Based on Soft-Output Decoding", IEEE 66th Vehicular Technology Conference, pp. 1057-1061, 2007.

Gerharz et al., "Link Stability in Mobile Wireless Ad Hoc Networks", Proceedings of the 27th Annual IEEE Conference on Local Computer Networks, 10 pages, 2002.

McQuillan, et al, "An overview of the New Routing Algorithm for the ARPANET", ACM SIGCOMM Computer Communication Review, vol. 25, pp. 54-60, 1995.

Moy, Ospf version 2, RFC 2328, pp. 1-204, Apr. 1998.

Baras, et al "Component Based Performance Modelling of the Wireless Routing Protocols", IEEE ICC Ad Hoc and Sensor Networking Symposium, pp. 1-6, Jun. 2009.

Lim, et al., "Link Stability and Route Lifetime in Ad-hoc Wireless Networks", Proceedings of the International Conference on Parallel Processing Workshops, 8 pages, 2002.

Obilisetty et al., "Link Stability Based Enhancements to OLSR (ls-olsr)", IEEE 62nd Vehicular Technology Conference, pp. 306-310, 2005.

Su et al., "Mobility Prediction in Wireless Networks", MILCOM, vol. 1, pp. 491-495, 2005.

Clausen, et al., Optimized Link State Routing Protocol (olsr), RFC, pp. 1-71, Oct. 2003.

* cited by examiner

| Leaf-node | Optimal Paths |
|---|---|
| $i_4$ | $h \rightarrow i_4$ |
| $j_1$ | $h \rightarrow i_1 \rightarrow j_1$ |
| $j_2$ | $h \rightarrow i_1 \rightarrow j_2$ |
| $j_3$ | $h \rightarrow i_1 \rightarrow j_3$ |
| $j_4$ | $h \rightarrow i_1 \rightarrow j_4, h \rightarrow i_2 \rightarrow j_4$ |
| $j_5$ | $h \rightarrow i_1 \rightarrow i_2 \rightarrow j_5$ |
| $j_6$ | $h \rightarrow i_3 \rightarrow j_6$ |
| $j_7$ | $h \rightarrow i_3 \rightarrow j_7$ |

TOPOLOGY SELECTION AND BROADCAST METHOD FOR RULE-BASED LINK STATE ROUTING

CROSS-REFERENCES TO RELATED APPLICATIONS

This application claims the benefit of Application Ser. No. 61/249,724 filed on Oct. 8, 2009 which is incorporated herein by reference in its entirety.

GOVERNMENT SUPPORT

The subject matter disclosed herein was made with government funding and support under W911NF0710287 awarded by ARO. The government has certain rights in this invention.

FIELD OF TECHNOLOGY

The exemplary implementations described herein relate to methods and apparatuses for selecting link-state information to be disseminated/broadcast in a routing domain (it includes the hosts/routers in an autonomous system of intra-domain routing, mobiles devices in a mobile ad hoc network, etc.) for link-state routing. Specifically, the exemplary implementations provide details on how to select the link-state to be broadcast, such that paths offering Quality of Service (QoS) are preserved for link-state routing. The exemplary implementations also can be used to select the hosts that broadcast the link-state information, i.e., the flooding overlay network.

BACKGROUND

Link state routing protocols are a class of routing protocols that make visible, by broadcast, to every station/router in the network the set of links, and their states in the communication graph. The state could indicate a coarse ON-OFF representation or more detailed representation of the cost of link, which is used for computing optimal routes. Link state routing protocols have a significant importance in the history of routing in data networks. A notable one was in the stabilization of the ARPANET routing protocol.

Current day intra-domain routing protocols such as OSPF also employ link state mechanism. In OSPF, the cost (also called metric) of an interface link is an indication of the overhead required to send packets across a certain interface, i.e., the cost of an interface is inversely proportional to the bandwidth of that interface. In the past decade, link state mechanisms have also been adopted to Mobile Ad Hoc Networks (MANETs), e.g., OLSR protocol.

Most methods, to date, have been based on constructing a Connected Dominating Set (CDS) via local pruning. Local pruning, as used in relation to the prior art methods, refers to the mechanism by which a host which is aware of only local neighborhood information (typically k-hop neighborhood information), prunes edges or vertices for broadcast. In other words, it is the process by which a host selects only a subset of the link-state information, via pruning, that is broadcast in the routing domain. Connected Dominating Sets (CDS) are a subset of vertices/nodes, which are routers in this context, that are used to construct a flooding overlay network such that any information flooded via the CDS reaches all the nodes (routers) in the routing domain/autonomous system. However, such methods based on CDS guarantee only properties of nodes/vertices, and not that of paths. Consequently, CDS based methods cannot trivially guarantee that paths with QoS are preserved during the local pruning operation.

SUMMARY

An exemplary implementation for optimizing the link-state information that is to be broadcast in a routing domain (autonomous systems or mobile ad hoc networks) uses a processor programmed to discover local neighborhood information and broadcast the selected link-state information. The link-state information is selected based on the local neighborhood information (the host, intermediate nodes and the leaf-nodes of the local neighborhood) such that paths which are QoS optimal are preserved for link-state routing. In the herein disclosed exemplary implementations, QoS optimal paths are computed in accordance with a rule of routing, such as shortest path routing rule. The host, h, determines the locally optimal paths from itself to every leaf-node (of the local neighborhood) that are QoS optimal (based on any rule of routing). The one-hop neighbors, $i_k$, of the host that constitute the first link, $(h,i_k)$, of these locally optimal path to every leaf-node are identified and a minimal set of such one-hop neighbors on the QoS optimal paths to reach every leaf-node is determined. The links corresponding to this minimal set of one-hop neighbors, $(h,i_k)$, is then output as a significant link set for subsequent $\overline{\text{broadcast}}$ to all routing devices in the routing domain.

The minimal set of one-hop neighbors, described above, can also form an overlay flooding sub-network to broadcast the link-state information.

The routers, which are devices capable of implementing the above described methods and apparatuses, comprise mobile communication devices, fixed communication devices, or combinations thereof which communicate with each other directly without access to the public switched telephone network.

Non-limiting examples of rules of routing include Shortest Path Routing, Stable Path Routing, Max-Reliable Path Routing, Max-(Bandwidth/Capacity) Routing, Multi-path routing, or any other criteria or rules that define the optimality of a path, or a set of paths.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION OF EXEMPLARY IMPLEMENTATIONS

The exemplary implementations described herein can constitute software, hardware, or a combination of hardware and software. As those skilled in the art will readily recognize, software utilized in the described exemplary implementations can be stored in a tangible computer readable storage medium such as, for example, magnetic disks, cards, tapes, and drums, punched cards, paper tapes, optical disks and electronic memories, and subsequently loaded and executed in at least one processor. Hardware can be implemented on an application specific hardware, such as a routing processor or an Application Specific Integrated Circuit (ASIC).

Figure 1:
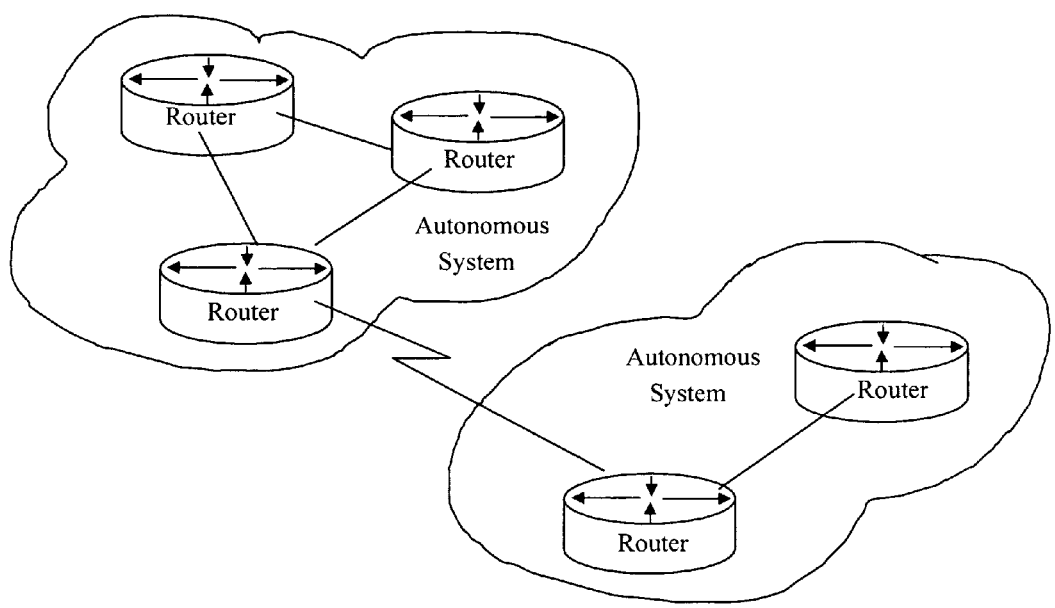
FIG. 1 is schematic diagram of an example computer network having a plurality of autonomous systems or routing domains, with intra-domain routers in each autonomous system.
Figure 2A:
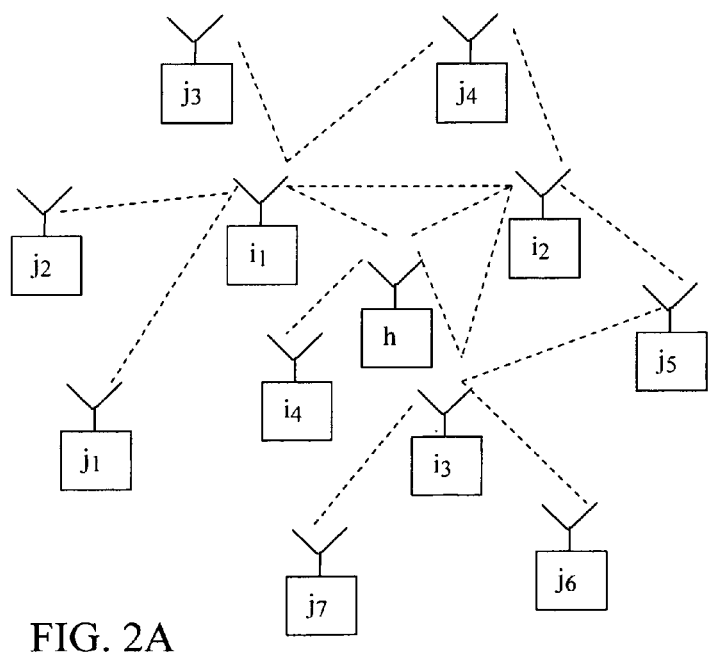
FIG. 2A is a schematic diagram of an example multi-hop wireless network, including mobile devices, such as cell phones, laptops, etc.
Figure 2B:
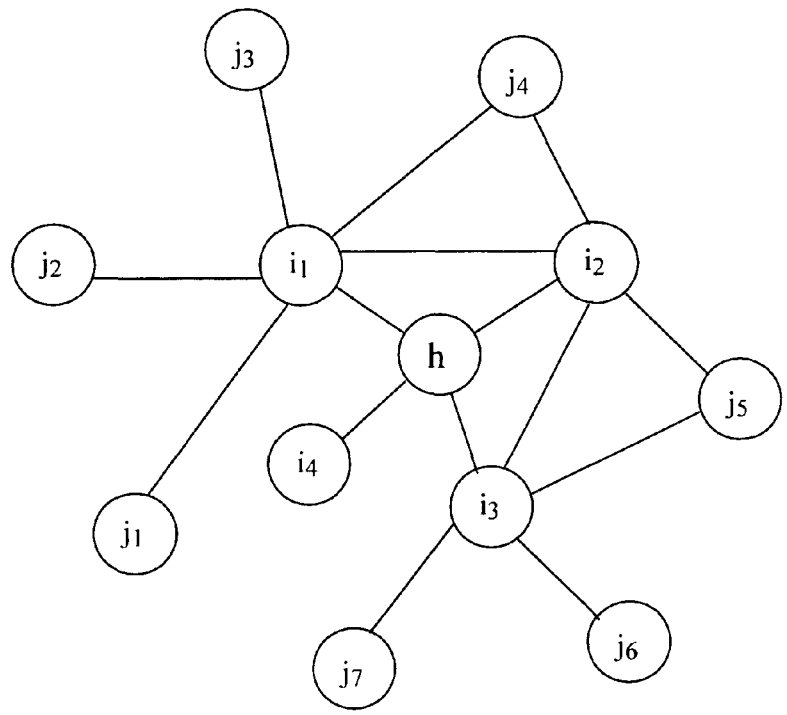
FIG. 2B is the communication graph adjacency corresponding to the example multi-hop wireless network shown in FIG. 2A.

FIG. 1 depicts a computer network, such as the Internet, which includes a plurality of autonomous systems. Within each autonomous system, there are a number of intra-domain routers. FIG. 2A is a schematic block diagram of a mobile ad hoc network, i.e., a mobile multi-hop wireless network composed of routers (the mobile devices themselves are the routers, i.e., they have routing components in them) in one routing domain. The exemplary implementations utilize an intra-domain routing protocol called link-state routing protocol. In the link-state routing protocol, each router, also called a host, broadcasts the incident links (the set of links that are incident to each host), to all the routers within the domain. Each host advertises via flooding, or some other broadcast mechanism, to the set of its neighbors (neighboring routers) to all the routers in the domain. Subsequently, every router knows the communication graph. For the network of FIG. 2A, the link state routing mechanism exposes the communication adjacency graph shown in FIG. 2B to every router in the communication network.

Figure 3:
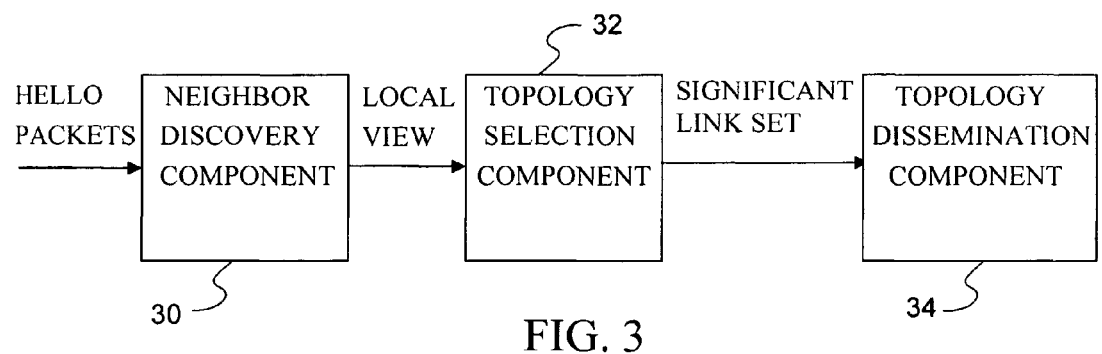
FIG. 3 is a schematic component-level block diagram of a neighbor-knowledge/local-pruning link-state routing method.
Figure 4:
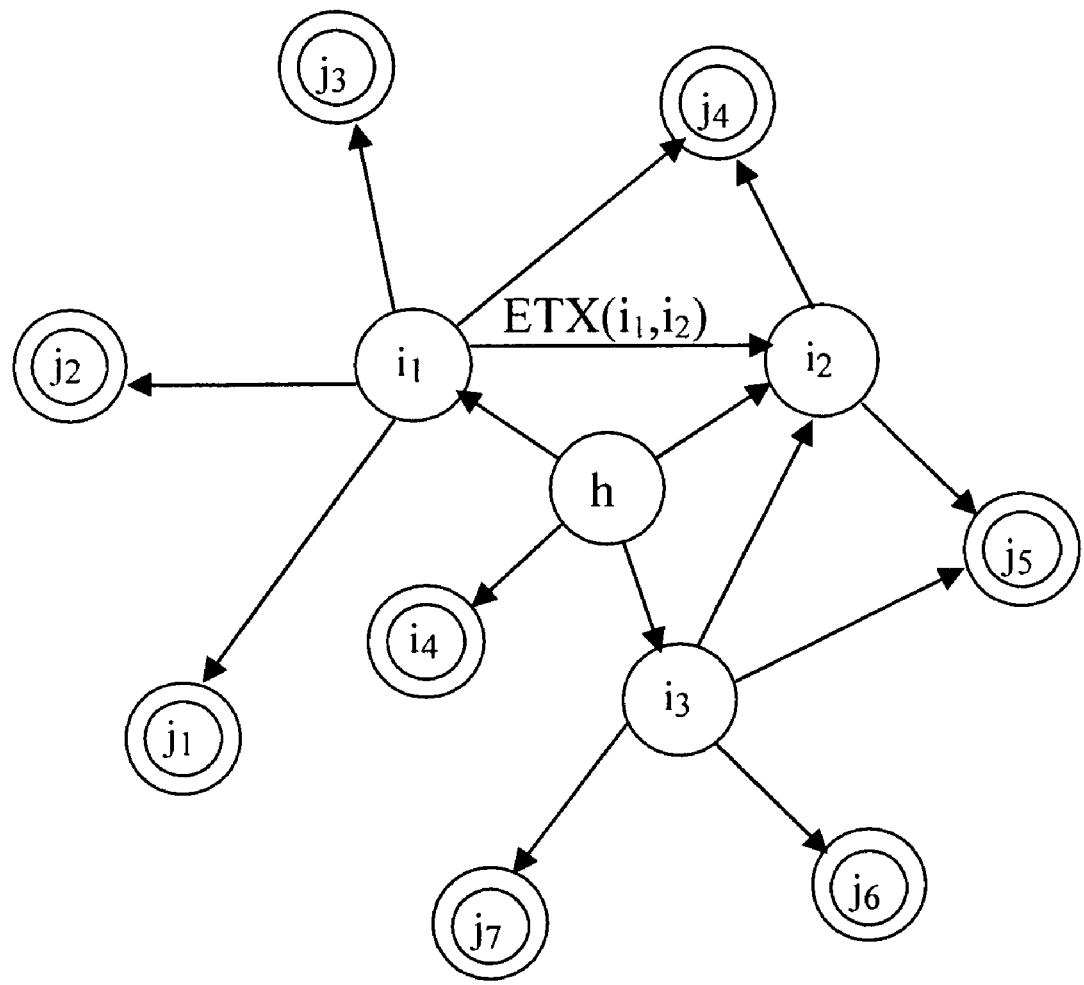
FIG. 4 is a network graph diagram of the local view of exposed by the neighbor discovery mechanism corresponding to the example in FIG. 2.

The exemplary implementations seek to reduce the amount of links that are broadcast by local pruning. FIG. 3 is a block diagram of the link state broadcast mechanism for reducing the amount of links that are broadcast by local pruning. A NEIGHBOR DISCOVERY COMPONENT 34 discovers the local link state information which is the local neighborhood information, such as the two-hop neighborhood information. In general, it could be the k-hop neighborhood information. Note that the two-hop neighbor information for a node consists of a list of one-hop neighbors and the list of neighbors for each of the one-hop neighbors in the list. Using well-known neighbor discovery protocols used in link-state routing protocols such as in Optimized Link State Routing (OLSR), this neighborhood information can be learned. In a typical embodiment, these neighbor discovery protocols learn the local neighborhood from the HELLO packets which contain the information about the list of one-hop neighbors (or k−1 hop neighbors) and the link metrics associated with these neighbors. Such protocols are well known to those skilled in the art and can be readily implemented. For the example communication graph shown in FIG. 2B, NEIGHBOR DISCOVERY COMPONENT 30 at host h exposes this neighborhood information represented by directed graph shown in FIG. 4 which is called the local view of the host h. Apart from the directed graph, the link metrics are also exposed by NEIGHBOR DISCOVERY COMPONENT 30. The exposed directed graph along with the link metric is called the LOCAL VIEW. As an example metric, the ETX metric is shown in FIG. 4, i.e., ETX($i_1,i_2$). Note that in the figure, the metric is shown only for one link ($i_1,i_2$) as a representative; the link metrics of all the links in the local view of h are exposed by the neighbor discovery component of h. Later in the description, we describe an example using this ETX metric. However, the exemplary implementations are not restricted to the ETX metrics, any link metric can be applied.

This local view along with link weights is fed into TOPOLOGY SELECTION COMPONENT 32 shown in FIG. 3. The topology selection component at each host h is responsible for the selection of a subset of links incident at h, called SIGNIFICANT LINK SET. The exemplary implementation present methodologies and systems directed to how to select this SIGNIFICANT LINK SET. Once this SIGNIFICANT LINK SET is selected, it is fed into the TOPOLOGY DISSEMINATION COMPONENT 34 which does a network broadcast of the SIGNIFICANT LINK SET. The SIGNIFICANT TOPOLOGY broadcasted from each host/router in the network forms the link-state topology for routing.

Figure 5:
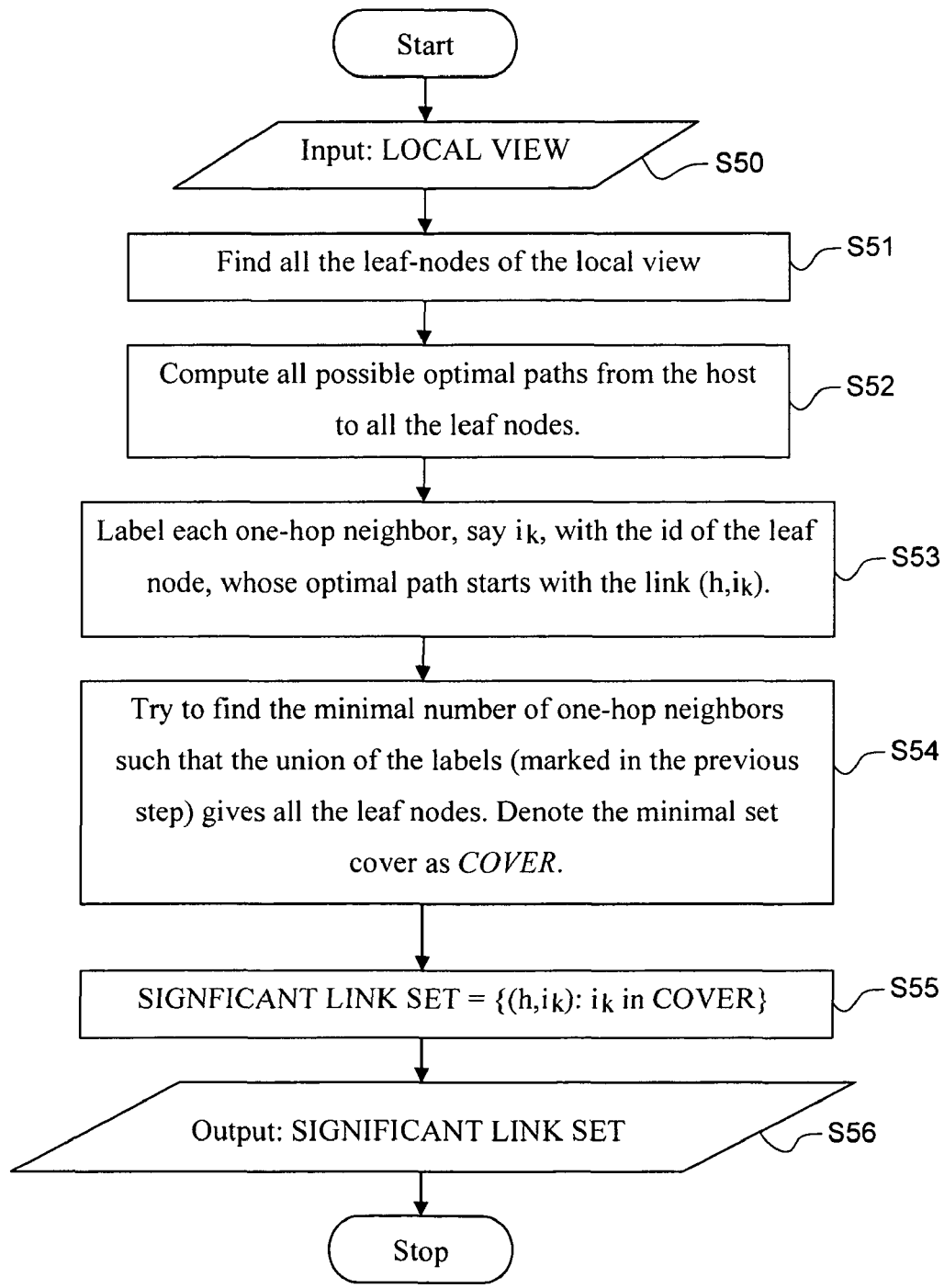
FIG. 5 is a flow-chart for finding the SIGNIFICANT SET, which is the reduced link state broadcast information originating at each host.

The SIGNIFICANT LINK SET for any rule based routing is chosen as per the procedure shown in the flow-chart of FIG. 5. A rule for routing could be any rule such as Shortest Path Routing, Stable Path Routing, Max-Reliable Path Routing, Max-(Bandwidth/Capacity) Routing, Multi-path routing, or any other rule that defines the optimality of a path, or a set of paths. Such rules for routing are well known to those skilled in the art because every routing implementation has some form of rule (written in terms of the metrics) for routing. For example, the most common rule for routing is the shortest-hop-count routing. Once the rule of optimality is defined then the methodology of FIG. 5 is used to find the SIGNIFICANT LINK SET. The methodology of FIG. 5 is implemented in TOPOLOGY SELECTION COMPONENT 32 of FIG. 3.

In the flow chart of FIG. 5, the procedure accepts the LOCAL VIEW as the input in step S50. In step S51 all the leaf-nodes within the local view are identified. The leaf-nodes are those nodes that have no children in the directed graph of the local view. In step S52 all the optimal paths in the local view to each of the leaf-nodes from the host are computed. These paths are called locally optimal paths. In step S53 all locally optimal paths are labeled beginning with link (h,$i_k$), where h is the host and $i_k$ is an one-hop neighbor (a node directly connected to h via a link) and each one-hop neighbor $i_k$, with the identity (id) of the lead-node whose locally optimal path uses the link (h,$i_k$).

Figures 6, 7:
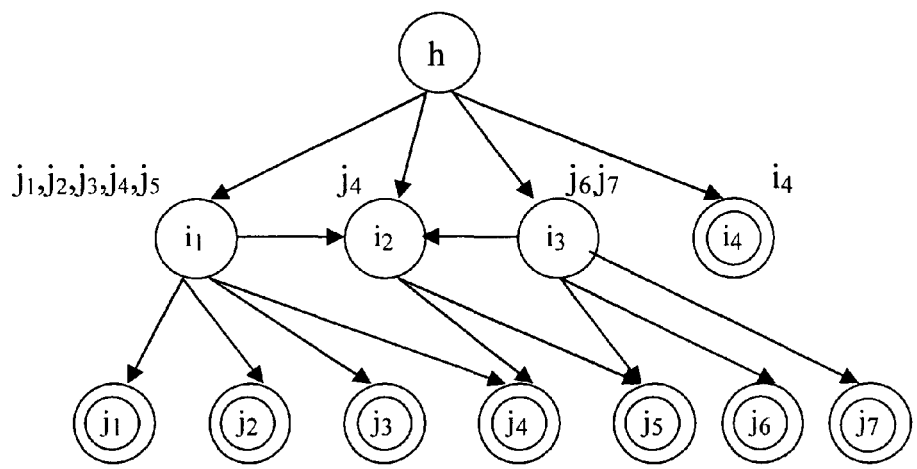
FIG. 6 is an example network graph, corresponding to FIG. 4, that illustrates the labeling procedure used in the flow-chart FIG. 5.
FIG. 7 is the table of optimal paths from the host to all the leaf nodes in the example local view shown in FIG. 6.

For the sake of clarity, we present an illustrative example for step S53. Consider the local view example of FIG. 4. The same directed graph can be represented as shown in FIG. 6. The leaf nodes in both FIG. 4 and FIG. 6 are indicated with double lined circles. The leaf nodes are $i_4, j_1, j_2, j_3, j_4, j_5, j_6$ and $j_7$. For the sake of this illustration let us assume the optimal paths are those given in the table of FIG. 7 (optimality could be for any metric, not necessarily the ETX metric); list of optimal paths from host h to every leaf node is shown in FIG. 7. Note that there could be more than one optimal path from h to a leaf node. For example, for the leaf node $j_4$, there are two optimal paths h→$i_1$→$j_4$ and h→$i_2$→$j_4$. Given these optimal paths the procedure in FIG. 4, labels each one-hop neighbor, say $i_k$, with the id of the leaf node, whose optimal path starts with the link (h,$i_k$). For example, the optimal paths for $j_1, j_2, j_3$ and $j_5$ start with the link (h,$i_1$), so h is labeled with $j_1, j_2, j_3$ and $j_5$. For the leaf-node $j_4$, there are two optimal paths, and they start with (h,i$_1$) and (h,i$_2$). Consequently, both i$_1$ and i$_2$ share the label j$_4$. Once all the one-hop neighbors are labeled, a minimum set of one-hop neighbors are selected in step S54 such the union of the labels on them gives all the leaf nodes. This is called COVER in the flow chart of FIG. 5. In the example of FIG. 6, the cover would be the set {i$_1$,i$_3$,i$_4$}. The next step S55 computes the SIGNIFICANT LINK SET, which for this example is {(h,i$_1$), (h,i$_3$), (h,i$_4$)}. Then this SIGNIFICANT LINK SET is fed into the TOPOLOGY DISSEMINATION COMPONENT 34 (FIG. 3), which broadcasts/advertises this information to all the routers/hosts in the domain.

The procedure illustrated above works for any notions of optimality defined on any Routing metric, including Shortest Path Routing, Stable Path Routing, Max-Reliable Path Routing, Max-(Bandwidth/Capacity) Routing, Multi-path routing, or any other metric or rule that defines the optimality of a path, or a set of paths. As a non-limiting example, we show how the procedure works for the ETX shortest path metric.

Figure 8:
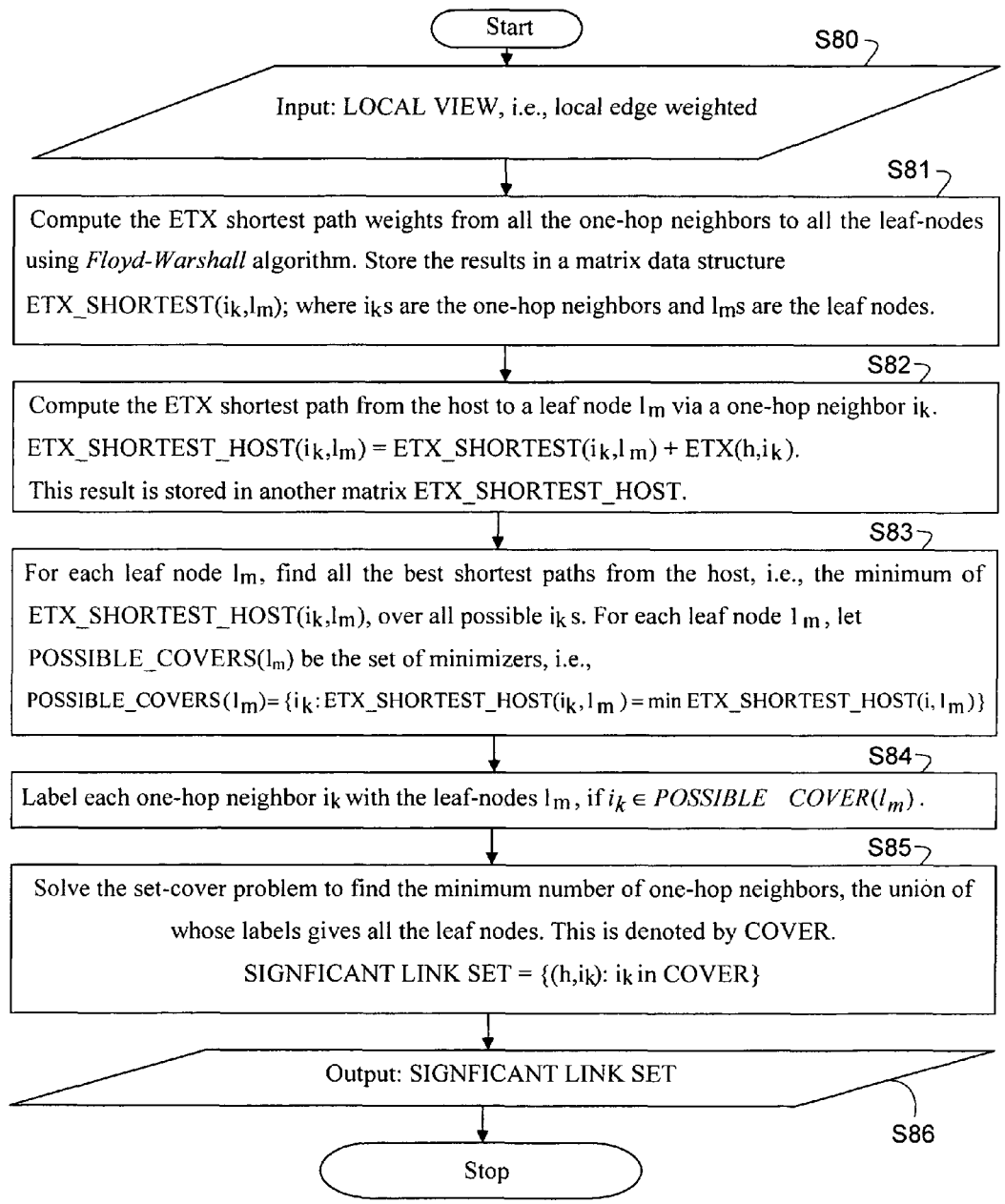
FIG. 8 is a flow-chart for computing the SIGNIFICANT SET for the example ETX metric.

An example to select the SIGNIFICANT LINK SET for the ETX metric based shortest/stable path is shown in FIG. 8. In step S80, the LOCAL VIEW, consisting of the directed graph having the link weights that are ETX metrics of the link, is input. Note that the ETX link metric is symmetric, i.e., for a link (u,v), ETX(u,v)=ETX(v,u). So we can imagine the LOCAL VIEW to an undirected graph. The optimal ETX shortest path metric between two nodes i and j is given by $$\min_{p \in P_{ij}} \sum_{(u,v) \in p} ETX(u, v),$$

where P$_{ij}$ is the set of paths from vertex i to vertex j. The sum inside the min is taken over all the edges that are in the path p∈P$_{ij}$. Once the local view is inputted to the procedure of FIG. 8, step S81 computes the ETX shortest path metric from every one-hop neighbor, i$_k$, to every leaf node, l$_m$. A standard procedure such as the Floyd-Warshall algorithm can be used to compute this. It is stored in a matrix denoted by ETX_SHORTEST. Then in step S82 the procedure computes the shortest path from the host h to every leaf node l$_m$ using a particular one-hop neighbor, say i$_k$. This is achieved using standard matrix addition, denoted in the procedure. The result is stored in another matrix called ETX_SHORTEST_HOST. In step S83, for each leaf node l$_m$, find all the best shortest paths from the host (similar to the example in the FIG. 7): the minimum of ETX_SHORTEST_HOST(i$_k$,l$_m$), over all possible i$_k$s. For each leaf node l$_m$, let POSSIBLE_COVERS(l$_m$) be the set of minimizers, i.e., POSSIBLE_COVERS(l$_m$)={i$_k$: ETX_SHORTEST_HOST(i$_k$,l$_m$)=min ETX_SHORTEST_HOST(i,l$_m$)}. Then in step S84 label each one-hop neighbor i$_k$ with the leaf-nodes l$_m$, if i$_k$∈POSSIBLE_COVER (l$_m$). This corresponds to the labeling procedure in FIG. 5. In essence, the procedure labels a neighbor with a leaf-node if any optimal path to this leaf-node passes through the link (h,i$_k$). Then in step S85 the SIGNIFICANT LINK SET is computed and output in step S86 for broadcast in the domain.

The nodes chosen in as COVER for all the hosts/routers in the routing domain, if put together, forms an overlay flooding sub-network that can be used to broadcast the link-state information. This is one way of implementing the TOPOLOGY DISSEMINATION COMPONENT 34 (FIG. 3); however, the inventions disclosed herein are not limited to this way of broadcasting in that other broadcast methods can be utilized.

While the foregoing written description of the inventions enables one of ordinary skill in the art to make and use what is considered presently to be the preferred implementations and best mode, those of ordinary skill will understand and appreciate the existence of variations, combinations, and equivalents of the specific implementation methods, and examples described herein. The inventions should therefore not be limited by the above described implementations, including methods, apparatuses, and examples, but by all such implementations within the scope and spirit of the appended claims.

What is claimed:

1. A computer implemented method for selecting the link-state information to be disseminated/broadcast within a communication network/routing domain having a plurality of routers or hosts, in accordance with a rule of routing, for link-state routing, said method comprising:
   using at least one processor programmed to perform the following:
   determining neighborhood information for a host, the neighborhood information comprising the links and link-quality information between the host, and the neighbors of the host;
   computing all possible locally optimal paths from the host to each one of the leaf nodes of the local neighborhood in accordance with the rule of routing;
   identifying each one-hop neighbor of the host;
   finding the minimal number of one-hop neighbors that provide paths to all of the leaf nodes of the local neighborhood to define a minimal set of one-hop neighbors; and
   creating a significant link set from links between said host and each member of said minimal set of one-hop neighbors.

2. The computer implemented method of claim 1, wherein the rule of routing is Shortest Path Routing.

3. The computer implemented method of claim 1, wherein the rule of routing is Stable Path Routing.

4. The computer implemented method of claim 1, wherein the host is a mobile or fixed device.

5. The computer implemented method of claim 4, wherein the mobile device is a laptop, PDA, notebook, or cellular telephone.

6. The computer implemented method of claim 1, further comprising using said minimal set of one-hop neighbors to broadcast said significant link set for link-state routing.

7. A system for selecting link-state information to be disseminated/broadcast within a communication network/routing domain having a plurality of routers or hosts, in accordance with a rule of routing, for link-state routing, said system comprising:
   neighbor discovery means for determining neighborhood information for a host, the neighborhood information comprising the links and link-quality information between the host and the neighbors of the host, and for computing all possible locally optimal paths from the host to each one of the leaf nodes of the local neighborhood in accordance with the rule of routing; and
   topology selection means for identifying each one-hop neighbor of the host, for finding the minimal number of one-hop neighbors that provide paths to all of the leaf nodes of the local neighborhood to define a minimal set of one-hop neighbors, and for creating a significant link set from links between said host and each member of said minimal set of one-hop neighbors.

8. The system of claim 7, further comprising topology dissemination means for broadcasting said significant link set for link-state routing.

9. The system of claim 8, wherein the host is a mobile or fixed device.

10. The system of claim 9, wherein the mobile device is a laptop, PDA, notebook, or cellular telephone.

11. The system of claim 7, wherein the rule of routing is Shortest Path Routing.

12. The system of claim 7, wherein the rule of routing is Stable Path Routing.

13. The system of claim 7, wherein the host is a mobile or fixed device.

14. The system of claim 13, wherein the mobile device is a laptop, PDA, notebook, or cellular telephone.

* * * * *